United States Patent
Graf

[19]

[11] Patent Number: 6,061,917
[45] Date of Patent: May 16, 2000

[54] TOOL PRESETTING DEVICE

[75] Inventor: Helmuth Graf, Balgach, Switzerland

[73] Assignee: PWB AG, Altstätten, Switzerland

[21] Appl. No.: 08/980,477

[22] Filed: Nov. 28, 1997

[30] Foreign Application Priority Data

Dec. 20, 1996 [EP] European Pat. Off. .............. 96120692

[51] Int. Cl.$^7$ .................................................. G01B 5/01
[52] U.S. Cl. ........................................ 33/201; 33/DIG. 2
[58] Field of Search .............................. 33/201, 626, 628, 33/DIG. 2

[56] References Cited

U.S. PATENT DOCUMENTS

| | | |
|---|---|---|
| 3,518,769 | 7/1970 | Bullard, III et al. ....................... 33/201 |
| 3,546,781 | 12/1970 | Cox et al. .................................. 33/201 |
| 3,701,199 | 10/1972 | Levis ........................................ 33/201 |
| 4,031,628 | 6/1977 | Kaesemeyer ............................. 33/201 |
| 4,099,800 | 7/1978 | Bell et al. ............................. 33/DIG. 2 |
| 4,228,595 | 10/1980 | Steinbach ................................. 33/201 |
| 4,532,716 | 8/1985 | Steiner . | |
| 4,669,192 | 6/1987 | Matheson et al. ......................... 33/626 |
| 5,347,723 | 9/1994 | Russell ................................. 33/DIG. 2 |

FOREIGN PATENT DOCUMENTS 3824603   1/1990   Germany .

*Primary Examiner*—Diego Gutierrez
*Assistant Examiner*—Quyen Doan
*Attorney, Agent, or Firm*—Martin A. Farber

[57] ABSTRACT

A tool presetting device comprises a carrier device for rotatably holding a tool. The tool is received in a bearing bushing which defines a bearing axis and provides a rotationally symmetrical bearing surface wherein said tool is enabled to be rotated in a desired measuring and setting position. An air suspension can be built up for enabling rotation of the tool. To this end, a source of pressurized air is provided which enables a certain throughput of air. At least one air outlet opens at the bearing surface, while receiving pressurized air from the said source. A switching device either admits or prohibits access of pressurized air to the air outlet. A throttle valve is connected to the source of pressurized air for limiting the throughput of air.

17 Claims, 2 Drawing Sheets

TOOL PRESETTING DEVICE

FIELD OF THE INVENTION

This invention relates to a tool presetting device comprising a tool carrier for holding a tool which is rotatable for measuring or setting purposes about a substantially vertical bearing axis into a desired position. The tool carrier comprises further a bearing bushing having a bearing surface, which is rotationally symmetric about the bearing axis, as well as an arrangement for building up an air suspension which renders the tool rotatable. The arrangement for building up an air suspension includes at least one distribution channel for pressurized air extending about the bearing axis and being situated in the hearing surface, and a supply of pressurized air which may be switched on or off by means of a switching device and includes a source of pressurized air.

BACKGROUND OF THE INVENTION

Presetting devices are used in machining centers where various exchangeable tools can be inserted. The tools are measured and/or set in a presetting device before use. To this end, the connecting zone of the tools, in particular a tapered trunnion, is put into a corresponding, and in particular also tapered, receiving recess. In doing this, the tool's axis has to be oriented in a defined direction and has to be enabled to be rotated about the tool's axis for measuring purposes.

From U.S. Pat. No. 4,532,716, a presetting device having an air bearing is known. While rotatability of the tools is ensured by an air bearing, rotating may be facilitated or made more difficult by building up or reducing the air suspension. Orientation in rotation is effected when the air suspension is built up. Having attained the desired rotational orientation, the supply of pressurized air to the air suspension is switched off. In this way, the tool assumes a supported position in which it is rotatable only with high forces applied, and in which it is supported within its carrier at a precise level which can be defined and determined. In this supported position, the tool can be measured precisely and may be set without the risk of undesired rotation while being continuously measured and monitored.

In order to build up the air suspension, a source of pressurized air is connected to an annular recess in a conical bearing surface via an On/Off valve and a pressure regulator. In this way, pressurized air may be led between the bearing surface and a supporting surface of the tool assigned to each other which are rotationally symmetric about the bearing and the tool's axis. Without supply of air under pressure, these supporting surfaces are pressed together by the weight of the tool, thus ensuring a desirable braking friction against rotation. Since the surfaces of the bearing surface of the carrier and tlie supporting surface of the tool, which are effective by friction and engage each other in a state without pressurized air, are tapered or conical, they engage each other in a centered manner, thus ensuring that the tool's axis extends always the same way.

When pressurized air is introduced under sufficient pressure, an air cushion is created between the two supporting surfaces which renders the frictional force neglectibly small. Since the required pressure depends on the weight of the carrier and the tool, a pressure regulator is provided. Thus, the pressure can be adjusted by the regulator in such a manner that the desired characteristics of rotation are attained. If the pressure is too high, undesirable vibrations could occur; if it is too low, the resistance against rotation is too high.

Now, it has been found that the tool carrier and the tools are often not supported by an appropriate pressure so that measuring and setting is done under bad supporting conditions which, in turn, involve a higher expenditure of energy and, particularly, lower precision as well as, in some cases, even damages caused by vibrations.

SUMMARY OF THE INVENTION

Therefore, it is an object of the present invention to provide a presetting device the air bearing of which enables both rotating the tool with low forces and an efficient adjustment thereof without the need of repeatedly and laboriously setting the pressure regulator.

This object is achieved in that the supply of pressurized air comprises a throttle valve connected to the source of pressurized air for limiting the throughput of air.

When an air cushion is built up, the upper supporting surface, and thus the tool, has to be raised by a small amount. In order to be able to generate the force necessary, the supporting surfaces should have a minimum dimension and a certain surface proportion having generatrices transversal to the tool's axis. In principle, a substantially horizontal orientation or an orientation along a plane normal to the tool's axis would also be possible, but in this case at least two other supporting surfaces assigned to each other would be needed for guiding rotational movement, a, preferably cylindrical, air bearing being enabled to build up between the two supporting surfaces.

In correspondence to the supporting area and the weight of the tool, at least a minimum air pressure has to be provided. Too high a pressure together with too high a throughput of air could result in vibrations between the two supporting surfaces. In contrast, by providing a throttled throughput of air, a further pressure range is created which enables operation on a higher pressure level. Since, however, a higher throughput of air is needed for a short time to build up the air cushion, the air supply comprises preferably a pressure accumulator or a stored volume of pressurized air from which air under pressure can flow between the supporting surfaces substantially without throttling it. With precisely matching supporting surfaces, only a very small throughput of air is needed to maintain an air cushion already built up. Consequently, the annular gap between the supporting surfaces which is occupied by the air cushion is correspondingly small. Due to the small thickness of this gap, the tool will be raised by a very little amount.

The air supply is preferably provided in such a manner that the air cushion(s) extend(s) in a rotationally symmetrical fashion around the bearing axis. To this end, a channel for distributing pressurized air is preferably arranged around the bearing axis in a respective supporting surface, particularly in the stationary or lower or outer one. This channel is open towards the opposite supporting surface and may be fed with pressurized air by a supply conduit.

According to the invention, the air supply may be switched on or off by a switching device, preferably a switching valve, and comprises a source of pressurized air as well as a throttle valve connected thereto for limiting the throughput of air. In particular, a pressure accumulator is interposed between the throttle valve and the switching valve. In some cases, however, the switching device may only consist of an on/off switch for the source of pressurized air, e.g. for switching the electric motor of a fan.

BRIEF DESCRIPTION OF THE DRAWINGS

The invention will now be described with reference to embodiments schematically illustrated in the drawings in which.

DETAILED DESCRIPTION OF THE DRAWINGS

Figure 1:
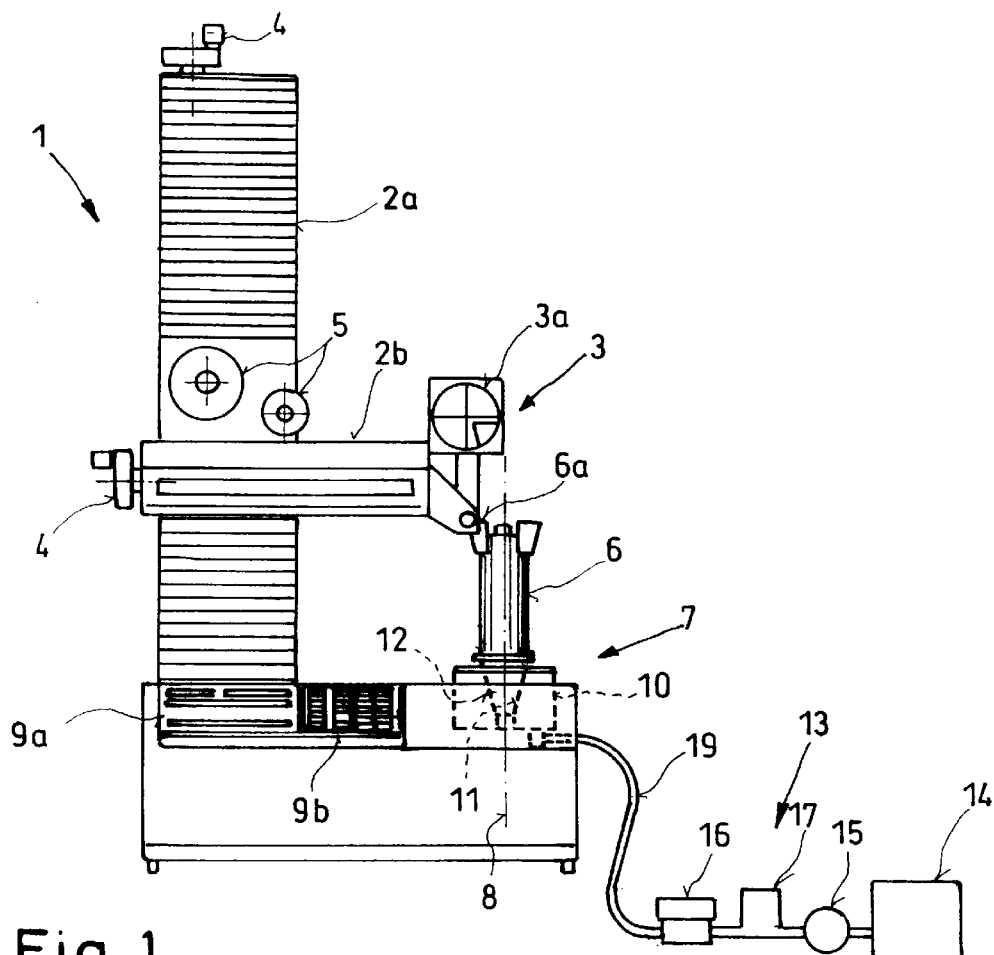
FIG. 1 shows an elevation of a presetting device comprising an arrangement for supplying pressurized air to an air bearing for holding a tool.

FIG. 1 shows a presetting device 1 comprising a vertical and a horizontal adjusting and measuring assembly 2a and 2b adapted and connected to each other in such a way that a projector 3 and its projected beam may be moved into any position of a vertical partial plane. For moving the projector 3, coarse and fine adjustment knobs 4 and 5 are provided. In a display zone 3a provided with a graticule, the position of a tool 6 and its machining portion 6a is shown when the machining portion 6a is within the path of the projection beam of the projector 3. The tool 6 is held in a carrier device 7 and extends upwards along the axis 8 of the tool and its bearing, respectively, substantially in vertical direction. The position of the projector 3 is indicated on a display 9a, preferably showing both portions which extend along the tool's axis 8 and an axis of the vertical partial plane perpendicular thereto. In order to simplify measuring operations and memorizing of values determined, an input panel 9b, a measuring control and a memory are preferably provided.

In the embodiment shown, the carrier device 7 comprises merely a bearing bushing 10 having a supporting bearing surface 11 which is rotationally symmetrical, preferably conical, around the bearing axis 8. As a second supporting surface, a tapered outer surface of a bearing trunnion 12 of the tool 6 is assigned to the bearing surface 11. In order to be able to build up an air suspension between the two supporting surfaces, an air supply 13 is provided which comprises at least one source 14 of pressurized air, a throttle valve 15 connected thereto for limiting the throughput of air, and, in particular, a pressure accumulator 17 arranged between the throttle valve 15 and switching valve 16, the pressure accumulator 17 providing the amount of pressurized air necessary for building tip the air suspension even with a small throughput of air during normal operation. The switching valve is preferably designed and arranged in such a manner that it may be actuated by foot or, optionally, by hand or finger. When the air suspension is switched off, the tool is held by one or both hands.

Figure 2:
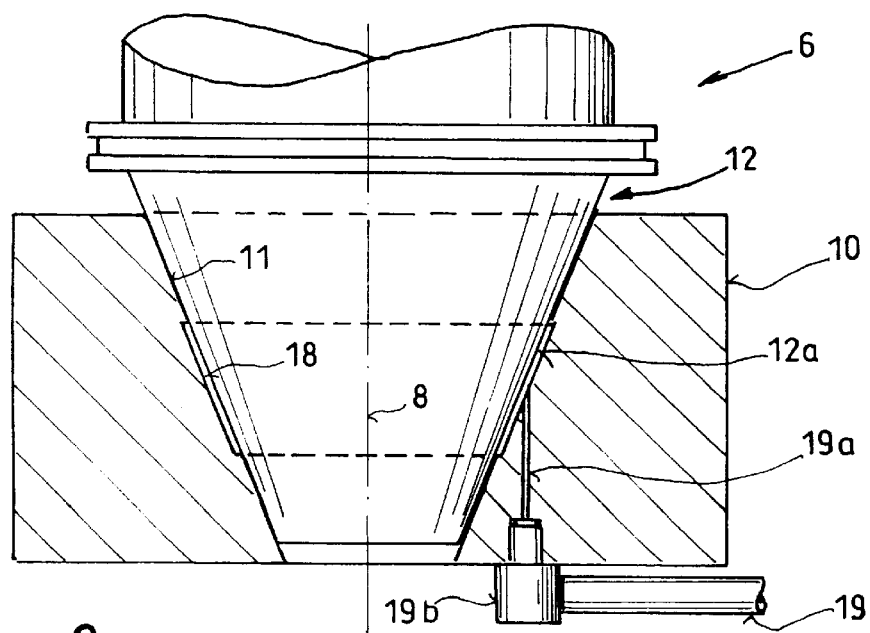
FIG. 2 is a vertical section through a bearing bushing showing a tapered bearing trunnion held directly therein.

FIG. 2 shows the carrier device according to FIG. 1 including the bearing bushing 10 in the conical bearing surface 11 of which a groove-like distribution channel 18 is formed and is open towards the bearing axis 8. The distribution channel 18 extends annularly around the bearing axis 8 and has a cross-section which ensures that the pressure is substantially uniform over the whole circumference when pressurized air is supplied. As a second supporting surface, the tapered outer surface 12a of the bearing trunnion 12 of the tool 6 is assigned to the bearing surface 11. In order to be able to build up an air suspension between the two supporting surfaces 11 and 12a, the air supply is connected to the distribution channel 18 through a supply conduit 19, a joint coupling 19b and a supply bore 19a in the bearing bushing 10. Air from the distribution channel 18 supplied with air under pressure flows through a thin annular gap which will establish between the two supporting surfaces 11 and 12a towards the upper and lower end surfaces of the bearing bushing 10.

Instead of a distribution channel 18, optionally a plurality of outlet openings connected to supply bores 19a could be provided in the lower bearing surface 11 which are, preferably, distributed in equal annular distances around the bearing axis 8. If desired, it would also be possible to have a bearing bushing 10 which is closed at its lower end and to provide there only one central outlet opening from which air may flow between the supporting surfaces towards to upper, open end of the bearing bushing 10. With such an air supply, even if the bearing trunnion 12 were not oriented precisely parallel to or aligned with the bearing axis 8 after rising, it could be displaced into the desired rotational orientation by a small torque only. When measuring, the supply of air under pressure is interrupted so that the supporting surfaces 11 and 12a engage each other and the tool's axis coincides with the bearing axis 8.

The shape of the tapered bearing surface 11 of the bearing bushing 10 corresponds preferably to the conicalness of a standard bearing trunnion, such as a steep-angle taper according to the ISO Standard, so that bearing trunnions 12 can be directly, and without any adapter, inserted into the bearing bushing 10. In order to be able to support other bearing trunnions, especially other standard trunnions, an adapter sleeve can be inserted into the bearing bushing 10, the outer surface of such an adapter sleeve being adapted to the inner surface of the bearing bushing 10, while the inner surface of the adapter sleeve is adapted to the outer surface of a respective bearing trunnion 12. Thus, the adapter sleeve would form part of the carrier device 7 and the bearing bushing 10, and the air bearing would be formed between the bearing bushing 10 and the adapter sleeve.

Figure 3:
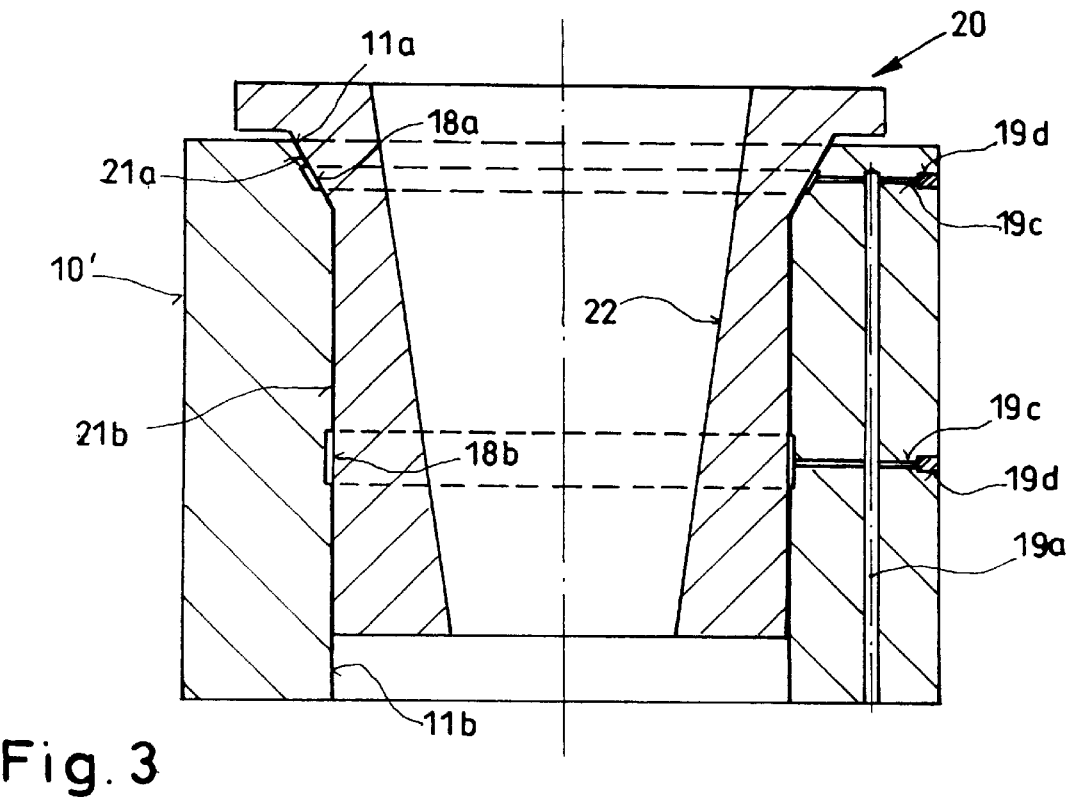
FIG. 3 is a vertical section through a bearing bushing, which has a cylindrical and a conical portion, and a bearing sleeve inserted therein.

FIG. 3 shows an embodiment of a low-cost carrier device for a variety of connecting portions of tools. In this embodiment, only a small axial portion of the inner surface of the bearing bushing 10' is formed as a tapered bearing surface 11a, whereas a larger axial portion forms a cylindrical bearing surface 11b. One distribution channel 18a and 18b is assigned to each of the bearing surfaces 11a and 11b. Supply of air to these distribution channels 18a and 18b is effected through an axial bore 19a and a respective radial bore 19c, each radial bore 19c being tightly closed at its radially outer side by a sealing element 19d. In order to be able to support standard bearing trunnions of different conicalness, bearing sleeves 20 are provided, the outer surfaces 21a and 21b of which forming supporting surfaces which are adapted to fit into the tapered bearing surface 11a or the cylindrical bearing surface 11b of the bearing bushing 10'. The inner surface 22 of each bearing sleeve, in turn, matches the respective shapes of a standard bearing trunnion.

The conical supporting surfaces 11a and 21a of the bearing bushing 10' and the bearing sleeve 20, which are assigned to each other, ensure the desirable stucking under an air-less condition, but a friction-less rotation of the bearing sleeve 20 and any tool inserted therein when an air cushion is established. In order to ensure a good truth of rotation, a separate air cushion is preferably built up also between the cylindrical supporting surfaces 11b and 21b for rotation. The tapered bearing region is preferably located directly at the upper edge of the bearing bushing 10' or immediately below a radial flange forming said edge, as may be seen from FIG. 3. If desired, however, it can be provided in a lower or intermediate portion of the length of the bearing bushing 10'. The advantage of the arrangement described, which has a bearing bushing 10' and a bearing sleeve 20, consists in that a cylindrical bearing surface or portion can be manufactured in a simpler and more favorable way than a tapered one. Moreover, the conicalness and the size of the tapered bearing portion can be chosen independently from the shape and size of a respective bearing trunnion in such a way that optimum stucking and supporting by air is possible. When an air bearing is built up between the bearing bushing 10', and a bearing sleeve 20, the risk of damaging the supporting surfaces 11a, 11b, 21a and 21b, thus affecting the air suspension, is very small, because these supporting surfaces are not stressed very much.

Figure 4:
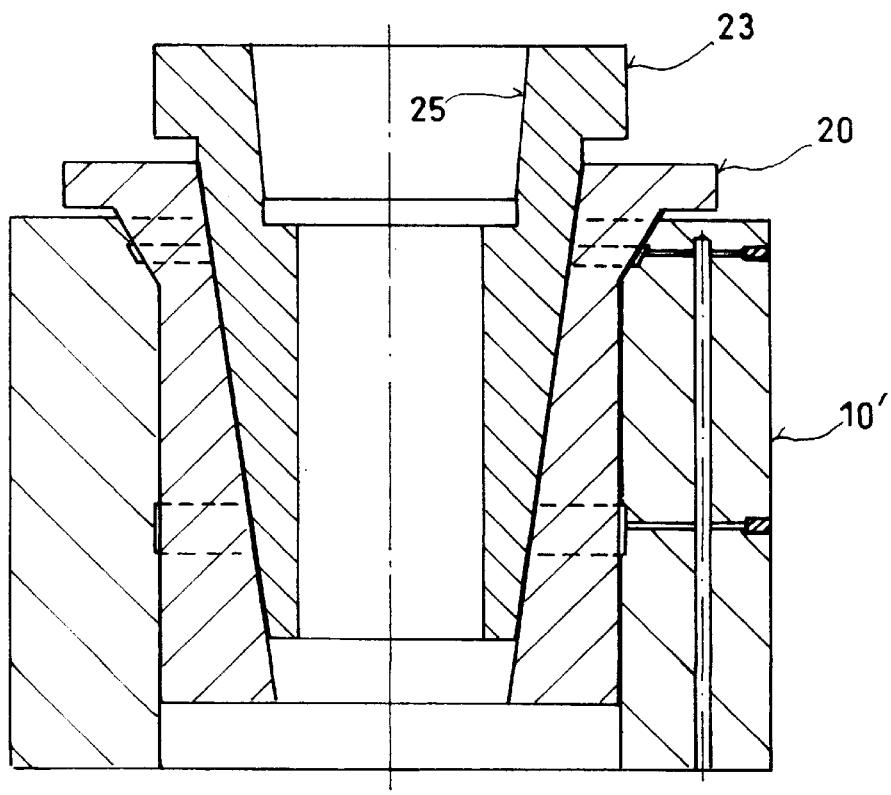
FIG. 4 is a vertical section through a bearing bushing, which has a cylindrical and a conical portion, and a bearing sleeve inserted therein into which, in turn, an adapter is inserted for receiving tools having a connecting portion with a hollow shaft.

FIG. 4 illustrates another embodiment of the carrier device in which an adapter 23 is inserted into the bearing sleeve 20. As in the embodiment of FIG. 3, the bearing sleeve 20 is rotatably supported within the bearing bushing 10'. It will be understood that the adapter 23 could equally be inserted into a bearing bushing 10 which matches the outer shape of the adapter 23. The adapter 23 has an outer shape corresponding to standards, preferably to a steep-angle taper according to the ISO standard, and inside any other standardized receiving hole having a connection surface 25 for receiving a special connecting portion of a tool, such as a conical hollow shaft.

It will be understood by those skilled in the art that the air suspension described above can also be applied in connection with other known presetting devices, in particular in connection with those employing a measuring pressure foot.

What is claimed is:

1. A tool presetting device comprising:

carrier means for rotatably holding a tool including bearing bushing means for receiving said tool, said bushing means defining a bearing axis and providing a rotationally symmetrical bearing surface wherein said tool is enabled to be rotated in a desired measuring and setting position; and means for building up an air suspension to enable said rotation of said tool, said air suspension means including:

a source of pressurized air for enabling a certain throughput thereof;

at least one air outlet means opening at said bearing surface and receiving said pressurized air from said source;

switching means for admitting and prohibiting access of said pressurized air to said outlet means; and throttle valve means connected to said source for limiting said throughput; and wherein said air suspension means further comprise pressurized air storing means interconnected between said throttle valve means and said air outlet means to provide the amount of pressurized air necessary for building up the air suspension even with a small throughput of air during normal operation.

2. A tool presetting device as claimed in claim 1, wherein said bearing axis is substantially vertical.

3. A tool presetting device as claimed in claim 1, wherein said air outlet means extend around said bearing axis.

4. A tool presetting device as claimed in claim 1, wherein said air outlet means comprise at least one distribution channel along said bearing surface open at it.

5. A tool presetting device as claimed in claim 1, wherein said air outlet means extend in a rotationally symmetrical fashion around said bearing axis.

6. A tool presetting device as claimed in claim 1, wherein said switching means comprise switching valve means.

7. A tool presetting device as claimed in claim 1, wherein said bearing surface is tapered at least over part of its length.

8. A tool presetting device as claimed in claim 7, wherein said tool has partially a tapered shape to form a connection surface, said tapering of said bearing surface matching said connection surface.

9. A tool presetting device as claimed in claim 8, wherein said air outlet means open between said bearing surface and said connection surface.

10. A tool presetting device as claimed in claim 1, wherein said bearing bushing means comprise hollow bushing means and a bushing sleeve having an outer surface to be inserted into said bushing means.

11. A tool presetting device as claimed in claim 10, wherein said air outlet means open between said bearing surface and said outer surface.

12. A tool presetting device as claimed in claim 1, wherein said bearing bushing means comprise hollow bushing means and adapter means to be received by said hollow bushing means, and said tool comprises a connection surface, said adapter means being also hollow to receive said connection surface of said tool and having an inner surface matching said connection surface.

13. A tool presetting device comprising:

carrier means for rotatable holding a tool including bearing bushing means for receiving said tool, said bushing means defining a bearing axis and providing a rotationally symmetrical bearing surface wherein said tool is enabled to be rotated in a desired measuring and setting position; and means for building up an air suspension to enable said rotation of said tool, said air suspension means including:

a source of pressurized air for enabling a certain throughput thereof;

at least one air outlet means opening at said bearing surface and receiving said pressurized air from said source;

switching means for admitting and prohibiting access of said pressurized air to said outlet means; and throttle valve means connected to said source for limiting said throughput;

wherein said switching means comprise switching valve means; and said air suspension means further comprise pressurized air storing means interconnected between said throttle valve means and said air outlet means, and said switching valve means are interposed between said air storing means and said air outlet means.

14. A tool presetting device comprising:

carrier means for rotatably holding a tool including bearing bushing means for receiving said tool, said bushing means defining a bearing axis and providing a rotationally symmetrical bearing surface wherein said tool is enabled to be rotated in a desired measuring and setting position; and means for building up an air suspension to enable said rotation of said tool, said air suspension means including:

a source of pressurized air for enabling a certain throughput thereof;

at least one air outlet means opening at said bearing surface and receiving said pressurized air from said source;

switching means for admitting and prohibiting access of said pressurized air to said outlet means; and throttle valve means connected to said source for limiting said throughput; and wherein said bearing surface comprises at least two portions of different shapes a separate air outlet means being assigned to each of said portions.

15. A tool presetting device as claimed in claim 14, wherein one of said portions is tapered.

16. A tool presetting device as claimed in claim 14, wherein one of said portions is cylindrical.

17. A tool presetting device comprising:

carrier means for rotatably holding a tool including bearing bushing means for receiving said tool, said bushing means defining a bearing axis and providing a rotationally symmetrical bearing surface wherein said tool is enabled to be rotated in a desired measuring and setting position; and means for building up an air suspension to enable said rotation of said tool, said air suspension means including:

a source of pressurized air for enabling a certain throughput thereof, at least one air outlet means opening at said bearing surface and receiving said pressurized air from said source, and throttle valve means interconnecting said source with said outlet means for limiting said throughput independently of pressure of the air and said air suspension means further comprise pressurized air storing means interconnected between said throttle valve means and said air outlet means to provide the amount of pressurized air necessary for building up the air suspension even with a small throughput of air during normal operation.

* * * * *